Patented Sept. 6, 1938

2,129,621

UNITED STATES PATENT OFFICE 2,129,621

THIAZYL MERCAPTIDE DERIVATIVES

Joy G. Lichty, Stow, Ohio, assignor to Wingfoot Corporation, Wilmington, Del., a corporation of Delaware No Drawing. Application June 16, 1936, Serial No. 85,546

17 Claims. (Cl. 260—299)

This invention relates to a new class of chemical compounds and to the process of their preparation. The compounds of the invention are addition products of zinc thiazyl mercaptides and ammonia or certain organic amines. They have been found valuable as accelerators of the vulcanization of rubber.

The mercaptothiazoles and metallic salts thereof, such as the zinc and lead salts of mercaptobenzothiazole have been known heretofore.

By this invention it has been discovered that ammonia and certain organic amines react with zinc salts of mercapto aromatic thiazoles, yielding products which are addition products of the ammonia or amine and the zinc mercaptide. The products are in general more powerful accelerators than the zinc aromatic thiazyl sulphides themselves. Also, the addition products of the invention are usually more soluble in petroleum hydrocarbons and in rubber than the zinc mercapto aromatic thiazoles. This property makes the addition products of the invention particularly valuable in latex compounds.

The addition products of the invention may be prepared by merely bringing the organic amine, or ammonia, and the zinc salt of the mercapto aromatic thiazole together, preferably in a liquid dispersion, and generally in suspension or solution in water. The reaction appears to be simply one of addition and is generally exothermic. In certain cases, it is advisable to heat the reaction mixture to be sure that the materials have reacted completely. Where the amine employed is a liquid, it is possible to omit the water or other liquid since the liquid amine, itself, constitutes the dispersion medium. Also, the zinc salt may be dissolved or suspended in other dispersing agents, such as alcohol, benzene, xylene and gasoline. The amine or ammonia and the zinc aromatic thiazyl mercaptide usually react in molecular proportions but in many cases two or three or perhaps more mols of the amine or ammonia will add to one mol. of the zinc mercaptide.

The preferred compounds of the invention are those which are stable at normal room temperatures. In general, such compounds are those in which the additory amine portion is an amine which is relatively non-volatile. Thus, the amine addition compounds which are more stable than the dimethyl amine complex are preferred in the practice of the invention, although dimethyl amine- and the less stable aliphatic amine- and ammonia derivatives are also included within the scope of the invention.

Of the zinc aromatic thiazole merceptides, zinc benzothiazyl mercaptide is most preferred in the practice of the invention although it will be understood that the class of zinc aromatic thiazyl mercaptides of the benzene and naphthalene series is also preferred. Illustrative of other zinc aromatic thiazyl mercaptides are the zinc salts of 1-mercapto 3-methyl benzothiazole, 1-mercapto 3-phenyl benzothiazole, 1-mercapto 3-5-dimethyl benzothiazole, 1-mercapto 5-nitro benzothiazole, 1-mercapto 5-chlor benzothiazole, 1-mercapto 4-nitro 5-chlor benzothiazole, 1-mercapto 5-hydroxy benzothiazole, 1-mercapto 3-methoxy benzothiazole, 1-mercapto 5-ethoxy benzothiazole, the 1-mercapto naphthothiazoles, and other mercapto aromatic thiazoles of the benzene and naphthalene series.

Of the organic amines which may be employed in the practice of the invention, the following class of amines is satisfactory: alicyclic, phenalkyl, furfuryl and tetrahydro furfuryl primary amines, aliphatic primary amines having not more than ten carbon atoms, N-alkyl alicyclic secondary amines in which the alkyl group has not more than five carbon atoms, dialkyl alkylene diamines in which the alkyl and alkylene groups have not more than five carbon atoms each, N-alkyl phenalkyl secondary amines in which the alkyl group has not more than five carbon atoms, dialkyl amines having not more than eight carbon atoms, N-alkyl tetrahydro furfuryl secondary amines in which the alkyl group has not more than five carbon atoms, and poly methylene secondary amines in which the poly methylene chain may be interrupted by an oxygen atom. Of these, the primary and secondary saturated amines and, in particular, the saturated primary amines are preferred. Also, as stated previously, the amines should for best results be more stable than dimethyl amine, or, in other words, should be less volatile at room temperatures than dimethyl amine. Illustrative of the primary and secondary saturated amines are diethyl amine, di-n-propyl amine, di isopropyl amine, ethyl isopropyl amine, ethyl n-butyl amine, di isobutyl amine, methyl amyl amine, cyclohexyl amine, N-methyl cyclohexyl amine, N-ethyl cyclohexyl amine, hexahydro beta phenethyl amine, hexahydro benzyl amine, decahydro alpha or beta naphthylamine, hexahydro o- or p-toluidine, hexahydro o- or p-phenetidine, hexahydro o- or p-anisidine, N-methyl hexahydro o- or p-phenetidine, n-butyl amine, the amyl primary amines, n-heptyl amine, piperidine, pyrrolidine, morpholine, tetrahydro alpha furfuryl amine, ethylene diamine, n-propylene diamine, sym. dibutyl ethylene diamine, sym. dimethyl ethylene diamine, N-methyl tetrahydro alpha furfuryl amine, N-ethyl tetrahydro alpha furfuryl amine and isobutyl amine.

Other amines which may be employed in the practice of the invention are beta and alpha furfuryl amine, the phenalkyl primary amines such as benzyl amine and beta phenethyl amine, and the N-alkyl phenalkyl secondary amines such as N-methyl benzyl amine, N-ethyl benzyl amine and N-methyl beta phenethyl amine. It will be observed that all of these amines with the exception of the alicyclic amines contain a —CH₂— group attached to the amino nitrogen atom and, also, at least one hydrogen attached to said amino nitrogen atom.

*Example 1*

Further illustrative of the invention is the preparation of the addition product of ethylene diamine and zinc benzothiazyl mercaptide which was prepared by heating to the boiling point a mixture of 39.7 grams of zinc benzothiazyl mercaptide, 33 grams of 60% aqueous ethylene diamine and 200 cc. of water. Only a part of the zinc salt went into solution, the remainder of the reaction product remaining as an oil. The aqueous layer was then decanted from the oil. On cooling, 10.2 grams of a solid (A) melting at 178–179° C. separated from the aqueous layer. The oily layer solidified on cooling, giving 35.7 grams of a somewhat impure product melting at a lower temperature. It is believed to consist principally of solid (A) and a small amount of impurities. Solid (A) was in pure form and is believed to be the addition product of 3 mols of ethylene diamine with one mol. of zinc benzothiazyl mercaptide. An analysis of the product melting at 178–179° C. gave an average nitrogen content of 18.92%, an average sulphur content of 21.95% and an average zinc content of 11.38% as compared with the theoretical nitrogen, sulphur and zinc contents of the addition product of zinc benzothiazyl mercaptide and 3 mols of ethylene diamine of 19.4%, 22.2% and 11.3%, respectively.

*Example 2*

In another illustrative example a suspension of 0.1 mol. of zinc benzothiazyl mercaptide and 0.22 mol. of cyclohexylamine in 200 cc. of water was heated to boiling. A yellow solid which was quite insoluble in water was obtained on cooling in the amount of 51.5 grams. It melted with decomposition over the range of from 73 to 160° C. and is believed to be the addition product of 1 mol. of zinc benzothiazyl mercaptide and two mols of cyclohexylamine.

*Example 3*

The addition product of ammonia and zinc benzothiazyl mercaptide was prepared by passing an excess of ammonia into 59.6 grams of finely divided zinc benzothiazyl mercaptide. After permitting the product to stand overnight it was found to weigh 62.4 grams. By analysis, this product was found to be the addition product of 1 mol. of ammonia and 1 mol. of zinc benzothiazyl sulphide.

Percent N found_____ 9.64, 9.58
Percent N for C₁₄H₈N₂S₄Zn.NH₃_____ 10.1

*Example 4*

Upon the addition of 28.7 grams of mixed amyl primary amines to 39.7 grams of zinc benzothiazyl mercaptide an exothermic reaction took place. The mixture was heated for a few minutes on a hot plate to assure a complete reaction. A small amount of solid, which was found to be zinc oxide present as an impurity with the zinc benzothiazyl mercaptide, did not go into solution. The liquid reaction product was then extracted several times with water in order to remove the excess amine and was then dissolved in benzene and the zinc oxide thereafter filtered off. The solvent was removed from the filtrate by heating to 50° C. at a pressure of 50–60 mm. A yield of 58.6 grams was obtained. The theoretical yield for a product containing 2 mols of the primary amyl amines and one of the zinc mercaptide is 57.1 grams. Upon analysis, an average nitrogen content of 8.95% and an average zinc content of 11.15% were found. This compared favorably with the theoretical nitrogen and zinc contents of the addition product of 2 mols of primary amyl amines with 1 mol. of zinc benzothiazyl mercaptide of 9.8% and 11.4%, respectively.

*Example 5*

A mixture of 39.7 grams of zinc benzothiazyl mercaptide and 33.3 grams of tetrahydro alpha furfuryl amine was warmed slightly on a hot plate, causing all materials to go into solution. The product was cooled, washed with water, and dissolved in benzene. The solution was then filtered to remove impurities, dried and the solvent removed by heating to a temperature of 70° C. at 60 mm. pressure. The product is believed to be the addition product of 2 mols of the amine and one mol. of the zinc mercaptide with approximately 10% of the solvent still present.

*Example 6*

19.9 grams of zinc benzothiazyl mercaptide (0.05 mol.) were suspended in 200 cc. of petroleum ether. 5.1 grams of piperidine (0.06 mol.) were added thereto and the mixture stirred for a period of one hour at room temperature. The product after being filtered, washed with water and dried, was obtained in an amount of 24.0 grams and was a light yellow solid melting at 195–200° C. It is believed to be the addition product of one mol. of piperidine and one mol. of the zinc mercaptide.

*Example 7*

4.4 grams of n-butyl amine dissolved in 50 cc. of petroleum ether were added to a suspension of 20 grams of zinc benzothiazyl mercaptide in 150 cc. of petroleum ether. The mixture was permitted to stand for a period of 30 minutes with occasional stirring. After filtering, washing with water and drying, the product was obtained as a tan sticky semi-solid in the amount of 22 grams. Nitrogen analyses indicated that it was the addition product of one mol. of n-butyl amine and one mol. of zinc benzothiazyl mercaptide.

Other illustrative compounds of the invention may be prepared similarly. Exemplary are the zinc benzothiazyl mercaptide addition products of dipropyl amine, hexahydro o- or p-toluidine, N-methyl cyclohexyl amine, N-methyl tetrahydro alpha furfuryl amine, N-ethyl tetrahydro alpha furfuryl amine, N-methyl hexahydro o-phenetidine, pipecoline, sym. dibutyl ethylene diamine, methyl amyl amine, dibutyl amine, N-ethyl cyclohexyl amine, benzyl amine, diethyl amine, and of the high boiling alkylene poly amines (obtained in the preparation of ethylene diamine, principally diethylene triamine and triethylene tetramine). Others are the addition products of zinc benzothiazyl mercaptide and of zinc 3-methyl benzothiazyl mercaptide with beta phenethyl amine, N-methyl benzyl amine, isobutyl amine, heptyl amine, ethanol amine, methyl propyl amine, methyl isobutyl amine, sym. dimethyl ethylene diamine, and morpholine. Other zinc aromatic thiazyl mercaptides of the benzene and naphthalene series may be used instead of the zinc benzothiazyl mercaptide and the zinc 3-methyl benzothiazyl mercaptide of the examples.

While the preferred embodiments of the invention have been described in detail herein, it will be understood that the invention is not so limited but that various modifications may be made therein without departing from the spirit of the invention or from the scope of the appended claims. Thus, while the molecular proportions have been given in most instances, these figures are not known definitely in all cases to be the true or only proportions in which the amines and the zinc aryl thiazyl mercaptides may be combined in the final products, although these are believed to be correct. Also, the melting points or decomposition points, as they may be called, of many of the compounds have in general a fairly wide range. This is probably for the reason that after some of the heating, portions of the amine and zinc mercaptide starting materials, resulting from dissociation, are present with the addition product. The melting points described were conducted in the normal atmosphere (open capillary tube). It is intended that the patent shall cover, by suitable expression in the appended claims, all features of patentable novelty inherent in the invention.

What I claim is:

1. The addition product of zinc benzothiazyl mercaptide and cyclohexyl amine, associated with not more than about 10% of material extraneous to such product.

2. The addition product of zinc benzothiazyl mercaptide and piperidine, associated with not more than about 10% of material extraneous to such product.

3. The addition product of zinc benzothiazyl mercaptide and amyl amine, associated with not more than about 10% of material extraneous to such product.

4. The addition products of zinc benzothiazyl mercaptide and a saturated primary amine, associated with not more than about 10% of material extraneous to such product.

5. The addition products of zinc benzothiazyl mercaptide and an aliphatic primary amine, associated with not more than about 10% of material extraneous to such product.

6. The addition products of zinc benzothiazyl mercaptide and a saturated secondary amine, associated with not more than about 10% of material extraneous to such product.

7. The addition products of a zinc benzothiazyl mercaptide and a saturated secondary amine, associated with not more than about 10% of material extraneous to such product.

8. The addition products of a zinc benzothiazyl mercaptide and a saturated primary amine, associated with not more than about 10% of material extraneous to such product.

9. The addition products of a zinc aromatic thiazyl mercaptide of the benzene and naphthalene series and a saturated organic amine containing at least one hydrogen atom attached to the amino nitrogen atom, associated with not more than about 10% of material extraneous to such product.

10. The addition products of a zinc aromatic thiazyl mercaptide of the benzene and naphthalene series and an amine containing at least one —CH₂— group attached to the amino nitrogen atom and at least one hydrogen attached to said amino nitrogen atom, associated with not more than about 10% of material extraneous to such product.

11. The addition products of a zinc aromatic thiazyl mercaptide of the benzene and naphthalene series and an amino compound selected from the group consisting of ammonia, alicyclic, phenalkyl, furfuryl and tetrahydro furfuryl primary amines, aliphatic primary amines having not more than ten carbon atoms, N-alkyl alicyclic secondary amines in which the alkyl group has not more than five carbon atoms, dialkyl alkylene diamines in which the alkyl and alkylene groups have not more than five carbon atoms each, N-alkyl phenalkyl secondary amines in which the alkyl group has not more than five carbon atoms, dialkyl amines having not more than eight carbon atoms, N-alkyl tetrahydro furfuryl secondary amines in which the alkyl group has not more than five carbon atoms, and poly methylene secondary amines in which the poly methylene chain may be interrupted by an oxygen atom, associated with not more than about 10% of material extraneous to such product.

12. The process of preparing the addition product of zinc benzothiazyl mercaptide and cyclohexyl amine which comprises interacting in a liquid medium zinc benzothiazyl mercaptide and cyclohexyl amine, and effecting a separation of the addition product from the liquid medium.

13. The process of preparing the addition product of zinc benzothiazyl mercaptide and piperidine which comprises interacting in a liquid medium zinc benzothiazyl mercaptide and piperidine, and effecting a separation of the addition product from the liquid medium.

14. The process of preparing the addition product of zinc benzothiazyl mercaptide and amyl amine which comprises interacting in a liquid medium zinc benzothiazyl mercaptide and amyl amine and effecting a separation of the addition product from the liquid medium.

15. The process of preparing an addition product of a zinc benzothiazyl mercaptide and a saturated primary amine which comprises interacting in a liquid medium a zinc benzothiazyl mercaptide and a saturated primary amine, and effecting a separation of the addition product from the liquid medium.

16. The process which comprises interacting in a liquid medium a zinc aromatic thiazyl mercaptide of the benzene and naphthalene series and an amino compound selected from the group consisting of ammonia, alicyclic, phenalkyl, furfuryl and tetrahydro furfuryl primary amines, aliphatic primary amines having not more than ten carbon atoms, N-alkyl alicyclic secondary amines in which the alkyl group has not more than five carbon atoms, dialkyl alkylene diamines in which the alkyl and alkylene groups have not more than five carbon atoms each, N-alkyl phenalkyl secondary amines in which the alkyl group has not more than five carbon atoms, dialkyl amines having not more than eight carbon atoms, N-alkyl tetrahydro furfuryl secondary amines in which the alkyl group has not more than five carbon atoms, and poly methylene secondary amines in which the poly methylene chain may be interrupted by an oxygen atom and effecting a separation of the product from the liquid medium.

17. The process which comprises interacting in a liquid medium a zinc aromatic thiazyl mercaptide of the benzene and naphthalene series and an amine containing at least one —CH₂— group attached to the amino nitrogen atom and at least one hydrogen attached to said amino nitrogen atom, and effecting a separation of the product from the liquid medium.

JOY G. LICHTY.